June 19, 1928.
F. HERING
1,674,112
DEVICE FOR THE MANUFACTURE OF METAL BALLS
Filed July 26, 1926
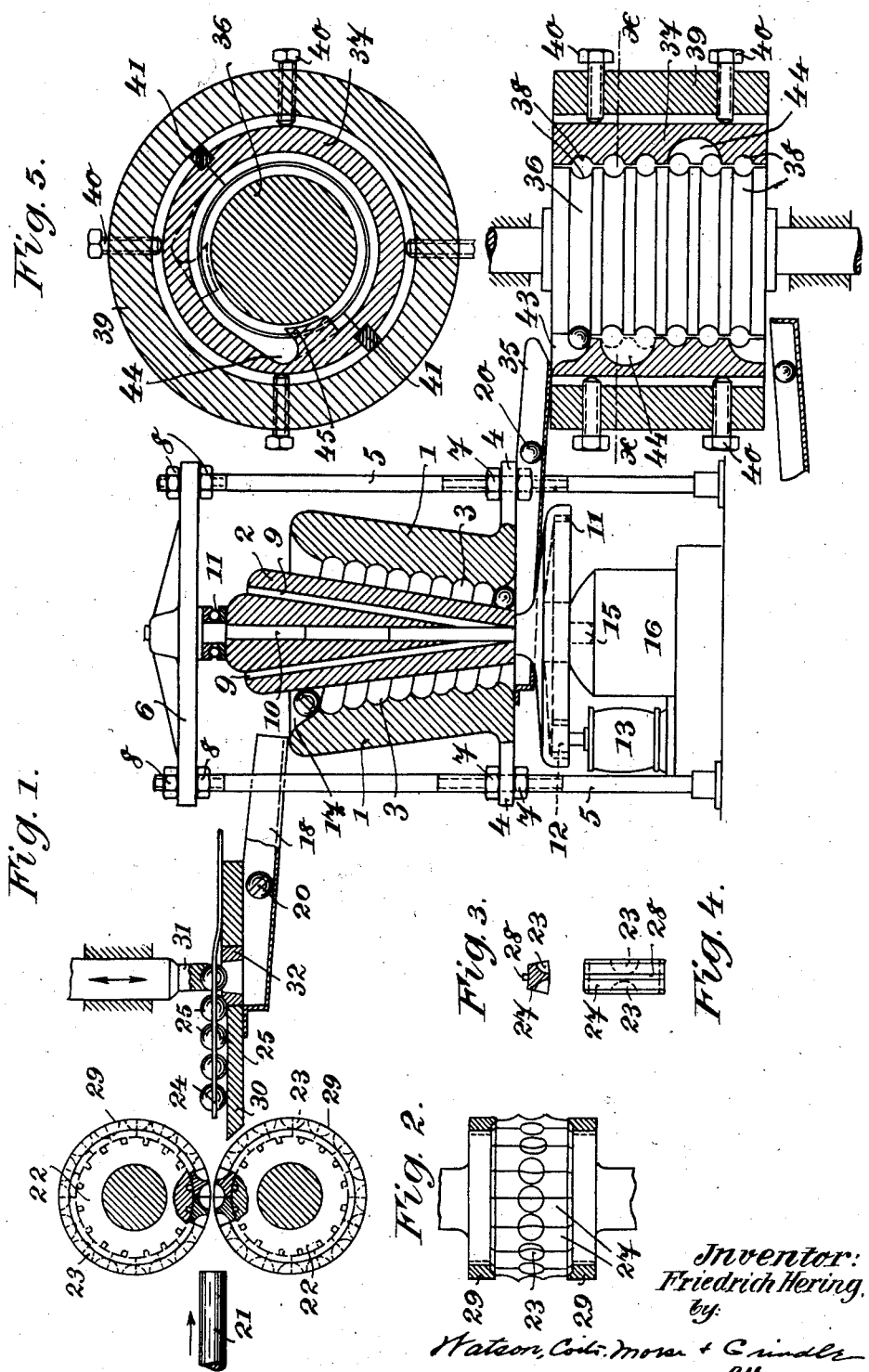
Inventor:
Friedrich Hering,
by
Watson, Coit, Moser & Grindle
Attorney.

Patented June 19, 1928.

1,674,112

UNITED STATES PATENT OFFICE.

FRIEDRICH HERING, OF GUMMERSBACH, GERMANY.

DEVICE FOR THE MANUFACTURE OF METAL BALLS.

Application filed July 26, 1926, Serial No. 125,101, and in Germany August 28, 1925.

For the manufacture of metal balls, particularly from steel, a cylindrical arrangement has already been arranged, consisting of an inner solid conical member and an outer hollow conical member arranged one within the other and provided upon their conical and adjacent surfaces with helical grooves of a semi-circular cross section. These conical members were so proportioned that their diameter was greater below than above. The pieces to be treated, which were cubical in form, were introduced at the top, and were intended to be converted into balls by their progress through the helical grooves of the two conical members. This known apparatus has not proved successful, since, on account of the increase of the diameter of the conical members downwards, the pieces encountered too great a resistance, and even if the pieces were introduced touching one another at the top, during their progress through the helical grooves they became so far separted due to the increase in the diameter, that they were no longer in contact with one another. Contact between the pieces, however, is highly expedient, since it forces the pieces to rotate into various planes and helps to smooth them. It is unsuitable, moreover, that the initial form of the pieces should be cubical, since an article of such a shape is difficult to rotate and these pieces tend to slide in the grooves without rotating.

The device which forms the object of the present invention comprises in the first place an arrangment of cylinders, which is composed of two cylindrical members located one within the other, and of conical form, with the cones diminishing downwards, that is, in the direction of motion of the pieces. Of the two cylindrical members, only one is provided with helical grooves, the cross section of which are circular arcs, while the other member is smooth. Only one cylindrical member rotates. The pieces to be treated are first formed roughly into balls, so that in their progress through the device the spherical shape only needs to be perfected. Owing to the tapering of the conical members of the device in such a manner that the pieces during their progress must pass through the helical scrow paths which have a constanaly diminishing diameter, the pieces are kept close to one another, so that they contact frictionally and cause each other to rotate in various directions, whereby the smoothing and the shaping into spheres is aided. The balls or spheres issuing from the device are suitable without further treatment for grinding purpose, ball mills and the like.

The treatment of the pieces takes place in a hot condition, and part of the invention resides in the shaping of the balls initially from the raw material under heat.

A further part of the invention consists of an initial process in a device which shapes the pieces from a bar, as nearly spherical as may be. This device consists of a pair of cylinders, in the casing of which a ring of hemi-spherical cavities is arranged. If a bar of suitable circular cross section is fed in a red-hot condition between the two cylinders, it is converted into a strip, on both sides of which hemi-spherical projections stand out at intervals.

A further part of the invention consists in a device which stamps out the separate spherical bodies from the aforementioned strip, so that pieces intended for treatment by the cylinder arrangement with conical members described above, are formed as nearly as possible spherical and without ridges.

A further part of the invention consists in a particular cylinder mechanism which is only employed if the balls are intended, not for ball mills and the like, but for ball bearings. This particular mechanism will smooth the surfaces of the balls yet further. It consists of two cylindrical bodies arranged one within the other, which are provided with grooves of nearly semi-circular cross section distinct from one another, while each pair of grooves is connected together by means of a passage for the pieces, so that the latter pass through each separate pair of grooves and are given in this device their final, and as perfect as possible, spherical shape.

The object of the invention is shown by way of example in the drawings:

Fig. 1 shows in elevation with part sections the whole device, with the afore-mentioned principal mechanisms arranged in relation one to another, in the order in which the pieces in a heated condition will pass through them.

Fig. 2 shows in plan a constructional form of the cylinders for the first treatment of the bar.

Fig. 3 shows in cross section, and

Fig. 4 in plan, a detail of Fig. 2.

Fig. 5 shows a horizontal section along the line X—X of Fig. 1.

The cylinder mechanism for the pieces already shaped into spheres, consists of the outer funnel member 1 and the inner conical member 2. In the inner surface of the funnel member 1 is formed a thread 3 of several turns, the diameters of which diminish towards the bottom. The angle of the cone of the smooth outer surface of the inner member 2 is sharper than the angle of the inner surface of the outer member 1, so that the distances of the working surfaces of parts 1 and 2 diminish towards the bottom.

The funnel member 1 is attached by means of lugs 4 to pillars 5 which are connected above by a cross piece 6. By means of nuts 7 the height of the funnel member 1 can be adjusted. The cross piece 6 is adjustable in height by means of nuts 8. In the cross-piece is located the inner conical member 2, provided with longitudinal passages for cooling purposes, together with its spindle 10. A thrust bearing 11 serves to take up the axial pressures caused by the working in the conical member 1. On the lower end of the spindle 10 a large toothed wheel 11 is arranged, with which engages the pinion 12 of the motor 13. The conical member 2 is supported by means of a pin 15 provided in the toothed wheel 11 resting upon a base 16.

For the more certain reception of pieces 20 fed along the channel 18, the funnel member is provided above with a trough-shaped extension 17.

In order initially to produce spherically-shaped pieces 20 from a bar, as is shown at 21, the two cylinders 22 are employed, which as viewed vertically are provided with a ring of nearly hemi-spherical cavities 23. If the bar 21 is fed between the cylinders 22 which are set in motion in a suitable manner, it is converted into a metal strip 24, from which hemi-spherical projections 25 stand out on both sides at intervals.

So long as only balls of comparatively small diameters are to be produced, the cavities 23 can be cut in the casing of the cylinders. For larger pieces, however, it is desirable to make the working members of the cylinders 22 in several parts, for instance, as shown in Figs. 2–4, separate segments 27 are provided, each of which forms two halves of adjacent spherical cavities 23. These segments are arranged, as will be seen from the figures, upon the cylinder members, and keys 28 provided upon their lower surfaces engage in corresponding grooves upon the cylinder members, whilst they are gripped and held in place by conical threaded end rings 29. In case of damage to the cylinders, this can be remedied by changing the separate elements.

The so-called strip of balls 24, 25 formed by the cylinders 22 from the bar 21 runs along a guide 30 to a stamping device, the stamp 31 of which is moved up and down by suitable means synchronously with the progress of the strip 24, 25 and which by means of its hemi-spherically shaped under surface co-acting with the circular knife 32 cuts a piece 25 out of the strip 24. Since the separation of the pieces 24 and 25 takes place only over a comparatively small surface of the ball, the pieces 20 produced in this manner already show a considerable approach towards a sperical shape, and their separation takes place by means of the parts 31 and 32 almost without causing ridges. On falling through the circular knife 32 the pieces 20 arrive in the afore-mentioned channel 18, roll into the trough 17 of the funnel member 1 and are moved down between the cylindrical members 1 and 2 through the groove 3, whereby the spherical shape is perfected.

From the cylindrical members 1 and 2 the pieces 20 are conducted through a channel 35, and as mentioned above if they are to undergo a further treatment, are fed to a particular cylinder mechanism. This consists as shown in the drawings of a perpendicular inner cylinder 36, which by means of a suitable drive is kept in continuous rotation, and of a fixed casing member 37. Both parts are provided with a number of ring grooves 38 lying in a horizontal plane. The casing member 37 is (Fig. 5) made in several parts, the separate parts being supported within the surrounding member 39 by means of adjusting screws 40. They are also secured in their exact reciprocal position by means of a key and recess connection, as shown at 41 in Fig. 5. Instead of the grooved member 37 having two parts as shown in Fig. 5 it can have several parts as desired.

The pieces 20 fall out of the channel 35 into the cavity 43 of the outer grooved member 37, which is so formed that the pieces are introduced into the circular groove 38 and are carried round. The grooves 38 following in a perpendicular direction one after the other are connected in pairs by means of enlarged passages 44 (Fig. 5), which extend downwards to the next groove below according to Fig. 1, and which at one point lead at a tangent from the groove. At the end of the passage 44 a tongue 45 is provided which extends into the grooves of the inner member to disengage the pieces with greater certainty from the groove. The dimensions of the grooves 38 grow smaller towards the bottom, in a manner corresponding to the desired reduction of the pieces so that the most equal pressure possible takes place during the entire process over the whole surface of the ball.

Between the grooved members 36 and 37 such an accurate shaping and efficient treatment of the balls takes place, that after hardening they only require polishing to be fit for service. The accuracy in spherical shape, as produced between the parts 36 and 37, cannot be produced by the conical members 1 and 2, since in that case the balls are only touched at one point by the inner cone 2.

I claim:

1. Apparatus for the manufacture of balls, such as steel balls, comprising an inner coned member, and an outer coned member, the angles of said coned members being different so that the space between them diminishes downwardly, helical grooves provided on one of said members, means for rotating one of said members while the other is stationary and means for forming roughly spherical bodies from a bar and delivering same between said coned members, comprising a pair of rotating cylinders having hemispherical cavities formed on their outer surfaces, between which said bar is fed, means for stamping out the spherical bodies so formed from the strip containing them, and a delivery channel for delivering the stamped-out bodies between the said coned members.

2. Apparatus for the manufacture of balls, such as steel balls, comprising an inner coned member and an outer coned member, the angles of said coned members being different so that the space between them diminishes downwardly, helical grooves provided on one of said members, means for rotating one of said members while the other is stationary, and means for roughly forming spherical bodies from a bar and delivering same between said coned members, comprising a pair of rotating cylinders having hemispherical cavities formed on their outer surfaces, between which said bar is fed, a stamping member formed with a hemispherical cavity, a circular knife adapted to co-operate with said stamping member to separate the spherical bodies from the strip containing them, and a channel located beneath said circular knife to deliver the stamped-out bodies between the said coned members.

3. Apparatus for the manufacture of balls, such as steel balls, comprising an inner coned member and an outer coned member, the angles of said coned members being different so that the space between them diminishes downwardly, helical grooves provided on one of said members, means for rotating one of said members while the other is stationary, a channel below said coned members adapted to conduct the balls delivered therefrom to means for further perfecting their spherical shape, said means comprising an inner cylindrical member and an outer cylindrical member, each of said members being provided with ring grooves communicating with each other, and means for rotating one of said cylindrical members while the other is stationary.

4. Apparatus for the manufacture of balls, such as steel balls, comprising an inner coned member and an outer coned member, the angles of said coned members being different so that the space between them diminishes downwardly, helical grooves provided on one of said members, means for rotating one of said members while the other is stationary, a channel below said coned members adapted to conduct the balls delivered therefrom to means for further perfecting their spherical shape, said means comprising an inner rotary cylindrical member and an outer stationary cylindrical member, each of said members being provided with ring grooves communicating with each other, said grooves being successively reduced in dimensions from above downwards.

5. Apparatus for the manufacture of balls, such as steel balls, comprising means for converting a round bar of material into strip form with oppositely-disposed hemispherical projections, means for separating each oppositely-disposed pair of hemispherical projections as a roughly-formed spherical body from the strip, a delivery channel, said channel communicating with means for reducing said roughly-formed spherical bodies to more accurate spherical shape, comprising an inner coned member and an outer coned member, the angles of said coned members being different so that the space between them diminishes downwardly, helical grooves provided on one of said coned members, and means for rotating one of said members while the other is stationary, a delivery channel located beneath said coned members, said channel communicating with means for perfecting the shape of the balls delivered from said coned members, comprising an inner cylindrical member, an outer cylindrical member, each of said members being provided with ring grooves communicating with each other, and means for rotating one of said cylindrical members while the other is stationary.

6. Apparatus for the manufacture of balls, such as steel balls, comprising a pair of rotating cylinders furnished with hemispherical cavities between which a round bar is fed, the bar being converted into strip form with oppositely-disposed hemispherical projections, a stamping member furnished with a hemispherical cavity and adapted to co-operate with a circular knife to separate each pair of oppositely-disposed hemispherical projections from the strip, a delivery channel located beneath said circular knife and communicating with the space between an inner rotating coned member and an outer stationary coned member, the angles of said coned members being different so that the space between them diminishes downwardly, a delivery channel beneath said coned members said channel communicating with the space between an inner rotating cylindrical member and an outer stationary cylindrical member, each of said members being furnished with ring grooves communicating with each other, and said ring grooves being of progressively smaller dimensions from above downwards.

In testimony whereof I affix my signature.
FRIEDRICH HERING.